United States Patent
Tsirkin et al.

(10) Patent No.: US 9,015,711 B2
(45) Date of Patent: Apr. 21, 2015

(54) POWER MANAGEMENT OF VIDEO DISPLAY DEVICES BY VIRTUAL MACHINES

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 285 days.

(21) Appl. No.: 13/484,041

(22) Filed: May 30, 2012

(65) Prior Publication Data

US 2013/0326508 A1  Dec. 5, 2013

(51) Int. Cl.
  *G06F 9/455* (2006.01)
  *G06F 3/048* (2013.01)
  *G06F 1/26* (2006.01)
  *G06F 1/32* (2006.01)

(52) U.S. Cl.
  CPC ............. *G06F 9/455* (2013.01); *G06F 1/3265* (2013.01); *G06F 9/45558* (2013.01)

(58) Field of Classification Search
  None
  See application file for complete search history.

(56) References Cited

U.S. PATENT DOCUMENTS

2012/0311578 A1* 12/2012 Hara et al. .................... 718/1

OTHER PUBLICATIONS

Sung, Dan; Samsung Galaxy S III: the phone is actually watching you; Pocket-lint.com, May 3, 2012.*
Samsung Galaxy S III Wikipedia entry; en.wikipedia.org/wiki/Samsung_Galaxy_S_III#cite_note-SMHS3launch-13; accessed on May 30, 2014.*
Smart Stay | Samsung Galaxy S3; samsung.com/global/galaxys3/smartstay.html; accessed on May 30, 2014.*

* cited by examiner

*Primary Examiner* — Meng An
*Assistant Examiner* — Bing Zhao
(74) *Attorney, Agent, or Firm* — Lowenstein Sandler LLP

(57) ABSTRACT

A system and method for display power management in a virtualized environment are disclosed. In accordance with one embodiment, a hypervisor receives a notification that a host operating system has received a command to dim a display, and forwards the notification to a guest operating system hosted by a virtual machine. The hypervisor receives from the guest operating system a first signal that indicates that the hypervisor is to notify the host operating system to refrain from executing the command. The hypervisor then transmits a second signal that notifies the host operating system to refrain from executing the command.

18 Claims, 7 Drawing Sheets

POWER MANAGEMENT OF VIDEO DISPLAY DEVICES BY VIRTUAL MACHINES

TECHNICAL FIELD

This disclosure relates to computer systems, and more particularly, to display power management in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, etc.). The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
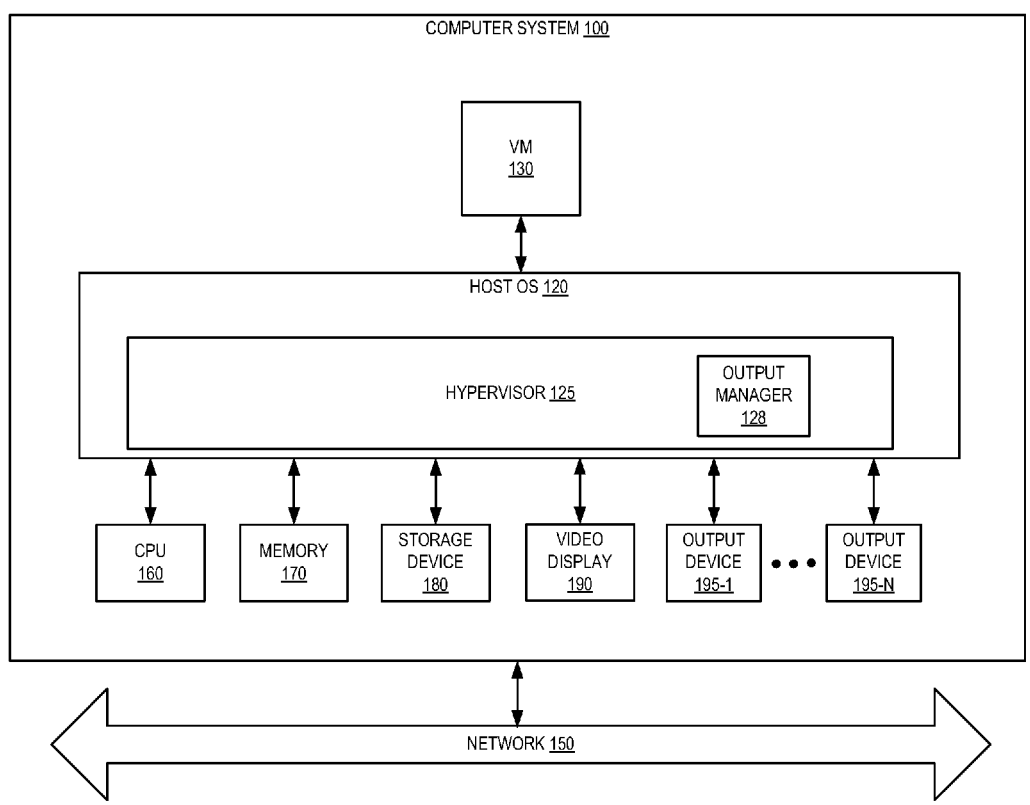
FIG. 1 depicts an exemplary computer system architecture, in accordance with an embodiment of the present invention.

An application that executes on a physical machine can provide power requirements to an operating system (OS). For example, a video player application might disable dimming of the video display when the application is visible on the display, but not when the application is minimized. In virtualized systems of the prior art, however, this technique does not work when the application executes within a virtual machine. In other words, in the example above, if the video player application executes within a virtual machine (VM), then the disabling will not take effect, and consequently the display will be dimmable, even when the video player application is visible.

Described herein is a system and method that is capable of handling display dimming when an application executes within a virtual machine. In accordance with embodiments of the present disclosure, the hypervisor receives a notification that the host operating system (OS) has received a command to dim a display, and forwards the notification to the guest OS of the virtual machine. In response, the guest OS transmits a first signal that indicates that the hypervisor is to notify the host OS to refrain from executing the command. The hypervisor then transmits, in response to the first signal, a second signal that causes the host OS to refrain from executing the command.

In one embodiment, dimming of the display is always disabled via the above method, regardless of whether or not the application executing within the VM is visible in the display, while in another embodiment, dimming of the display is disabled when the application is visible in the display, but not otherwise (e.g., when the application is minimized, when the application window is completely behind another application window, etc.).

Embodiments of the present disclosure are thus capable of overcoming a major deficiency of virtualized computer systems of the prior art: namely, the inability of applications executing within a virtual machine to perform power management for host video displays. In addition, embodiments of the present disclosure are also applicable to attenuating output of other host output devices, such as lowering the volume of an audio speaker. For example, embodiments of the present disclosure may disable lowering of the volume of the audio portion of a streaming movie in a video player application. As in the case of display dimming, some embodiments may disable lowering the volume regardless of whether or not the application is currently outputting audio to the speaker, while other embodiments may disable lowering the volume only when the application outputs audio to the speaker.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "forwarding", "transmitting", "executing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an computer system for performing the operations herein. This computer system may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other computer system. Various general purpose systems may be used with programs in accordance with the teachings herein, or it may prove convenient to construct more specialized computer system to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises central processing units (CPU) 160, main memory 170, which may include volatile memory devices (e.g., random access memory (RAM)), non-volatile memory devices (e.g., flash memory), and/or other types of memory devices, storage device 180 (e.g., one or more hard disk drives, solid-state drives, etc.), video display 190 (e.g., a liquid crystal display (LCD), a cathode ray tube (CRT) display, etc.), and one or more output devices 195-1 through 195-N (e.g., an audio speaker, a printer, etc.), where N is a positive integer. The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single video display 180 is depicted in FIG. 1, in some other embodiments computer system 100 may comprise a plurality of video displays. Similarly, in some other embodiments computer system 100 may comprise a plurality of CPUs 160, rather than a single CPU, and/or a plurality of storage devices 180.

Computer system 100 runs a host operating system (OS) 120, which manages the hardware resources of the computer system and that provides functions such as interprocess communication, scheduling, memory management, and so forth. In one embodiment, host operating system 120 also comprises a hypervisor 125, which provides a virtual operating platform for virtual machine(s) 130 and that manages the execution of virtual machine(s) 130. In accordance with this embodiment, hypervisor 125 includes an output manager 128 that is capable of disabling dimming of video display 180, as well as disabling attenuation of output devices 195, as described below with respect to FIGS. 3, 4, 5A and 5B. It should be noted that in some alternative embodiments, hypervisor 125 may be external to host OS 120, rather than embedded within host OS 120.

Virtual machine 130 is a software implementation of a machine that executes programs as though it were an actual physical machine. One embodiment of virtual machine 130 is described in more detail below with respect to FIG. 2.

Figure 2:
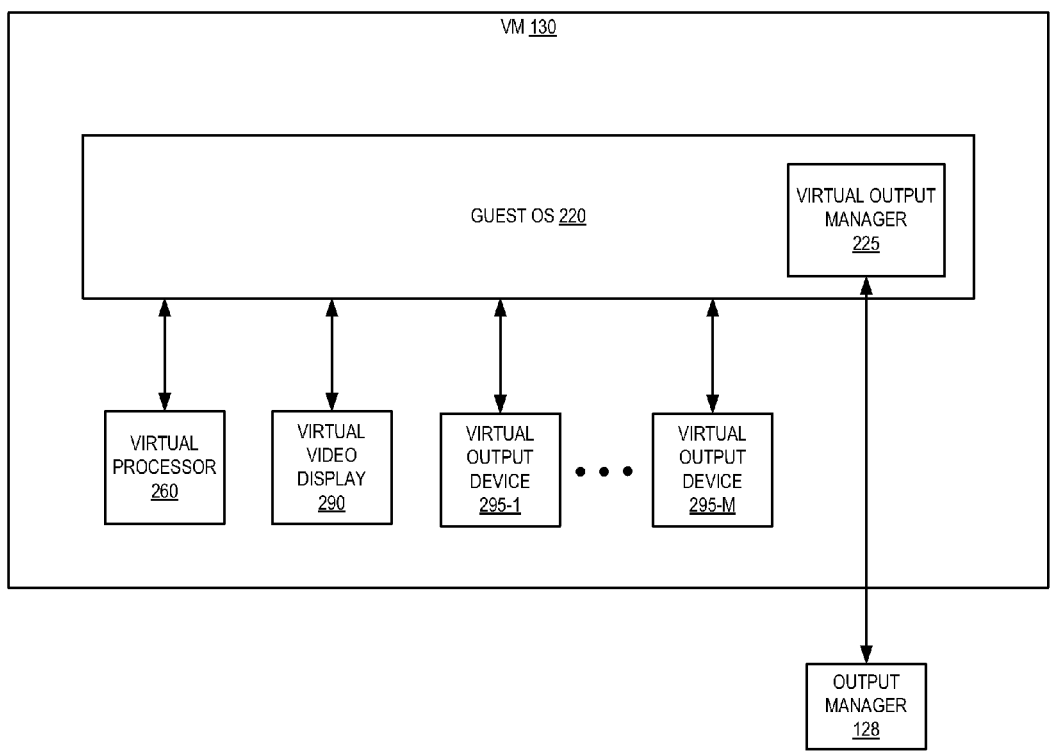
FIG. 2 depicts a block diagram of the salient elements of a virtual machine, in accordance with an embodiment of the present invention.

FIG. 2 depicts a block diagram of the salient elements of virtual machine 130, in accordance with an embodiment of the present invention. As shown in FIG. 2, virtual machine 130 comprises a guest operating system 220, a virtual processor 260, a virtual display 290, and one or more virtual output devices 295-1 through 295-M, where M is a positive integer.

Guest operating system (OS) 220 manages virtual machine resources and provides functions such as interprocess communication, scheduling, memory management, and so forth. In addition, guest OS 220 includes a virtual output manager 225 which is capable of performing the pertinent blocks of FIGS. 4 and 5 below, including determining whether output from virtual machine 130 is visible, and transmitting signals indicating that hypervisor 125 should notify host OS 120 to refrain from executing display dimming commands. The functionality of output manager 128 is described in more detail below with respect to FIGS. 4 and 5.

Virtual processor 260 emulates a physical processor and maps to central processing unit (CPU) 160. Similarly, virtual video display 290 emulates a physical display and maps to video display 190, and each virtual output device 295 emulates a physical device and maps to one of output devices 195. In one embodiment, the mapping between virtual output devices 295 and output devices 195 is one-to-one (in which case M=N), while in some other embodiments, the number of virtual devices 295 may not be the same as the number of devices 195 (i.e., M≠N), and/or the mapping may not be one-to-one. In one embodiment, hypervisor 125 manages these mappings in a transparent fashion, so that guest OS 220 and applications executing on virtual machine 130 interact with virtual processor 260, virtual video display 290 and virtual output devices 295 as though they were actual physical entities.

Figure 3:
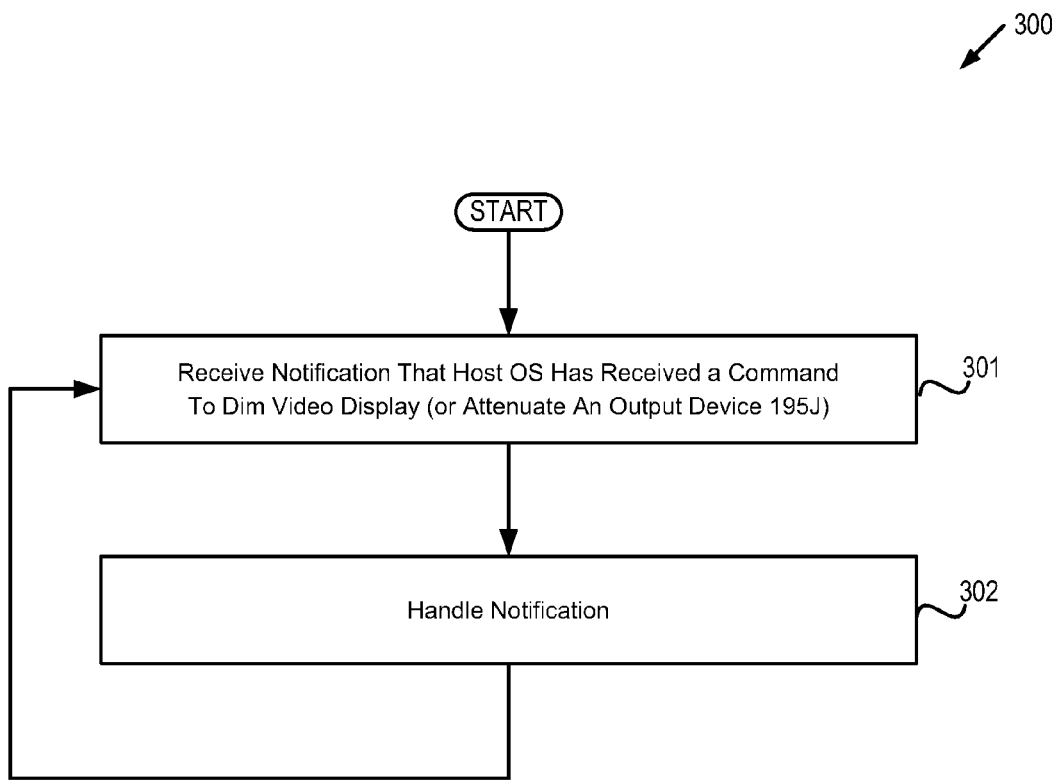
FIG. 3 depicts a flow diagram of one embodiment of a method for display power management in a virtualized computer system.

FIG. 3 depicts a flow diagram of one embodiment of a method 300 for display power management in a virtualized computer system. The method is performed by processing logic that may comprise hardware (circuitry, dedicated logic, etc.), software (such as is run on a general purpose computer system or a dedicated machine), or a combination of both. In one embodiment, the method is performed by the computer system 100 (e.g., output manager 128 of hypervisor 125 and/or virtual output manager 225 of VM 130) of FIG. 1, while in some other embodiments, some or all of the method might be performed by another machine.

At block 301, a notification is received that indicates that host OS 120 has received a command to dim video display 180 (or to attenuate an output device 195J, where J is an integer between 1 and N inclusive). In one embodiment, the notification is from an application that executes in one of the virtual machines 130, and that wishes to disable dimming of video display 180 (e.g., in response to a user manipulating a slider control for the brightness of the video display, etc.) or attenuation of the output device 195J. In one embodiment, the notification is received by output manager 128 of hypervisor 125.

At block 302, the notification is handled. In one embodiment, the notification is handled by output manager 128 and virtual output manager 225 in accordance with the method of FIG. 4, described below, while in another embodiment the notification is handled by output manager 128 and virtual output manager 225 in accordance with the method of FIGS. 5A and 5B, described below. After block 302, execution continues back at block 301.

Figure 4:
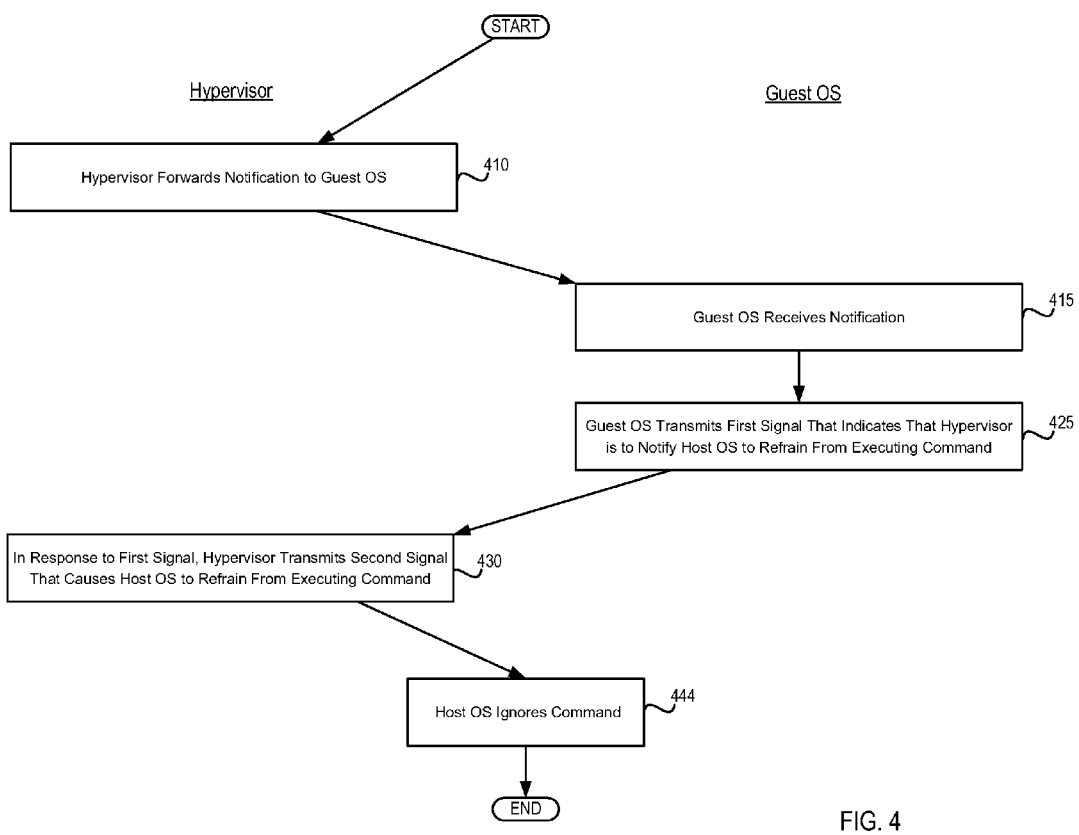
FIG. 4 depicts a flow diagram of one embodiment of a method for handling a notification that a host operating system has received a command to dim a display.

FIG. 4 depicts a flow diagram of one embodiment of a method for handling a notification that a host operating system has received a command to dim a display (or attenuate another output device). In this method, dimming of the display (or attenuation of another output device) is disabled regardless of whether output from virtual machine 130 is visible in the display (or is outputted by another output device); in some instances this handling of dimming and attenuation commands may be instead of that of FIGS. 5A and 5B, described below, where dimming of the display (or attenuation of another output device) is disabled only when output from virtual machine 130 is visible in the display (or is outputted by another output device). It should be noted that blocks depicted in FIG. 4 can be performed simultaneously or in a different order than that depicted.

At block 410, hypervisor 125 forwards the notification to guest OS 220. In one embodiment, the notification is forwarded by output manager 128 and is received by virtual output manager 225.

At block 415, guest OS 220 receives the notification. At block 425, guest OS 220 transmits a first signal that indicates that hypervisor 125 should notify host OS 120 to refrain from executing the command received at block 301 of FIG. 3, in order to prevent dimming of display 180 (or attenuation of output device 195J) via the application within VM 130 that transmitted the notification at block 301. In one embodiment, virtual output manager 225 transmits this signal to output manager 128.

At block 430, hypervisor 125 transmits, in response to the first signal, a second signal that causes host OS 120 to refrain from executing the command, in order to prevent dimming of display 180 (or attenuation of output device 195J) via the application. In one embodiment, block 430 is performed by output manager 128. At block 444, host OS 120 ignores the command, thereby ensuring that dimming of display 180 (or attenuation of output device 195J) via the application is in fact disabled.

Figure 5A:
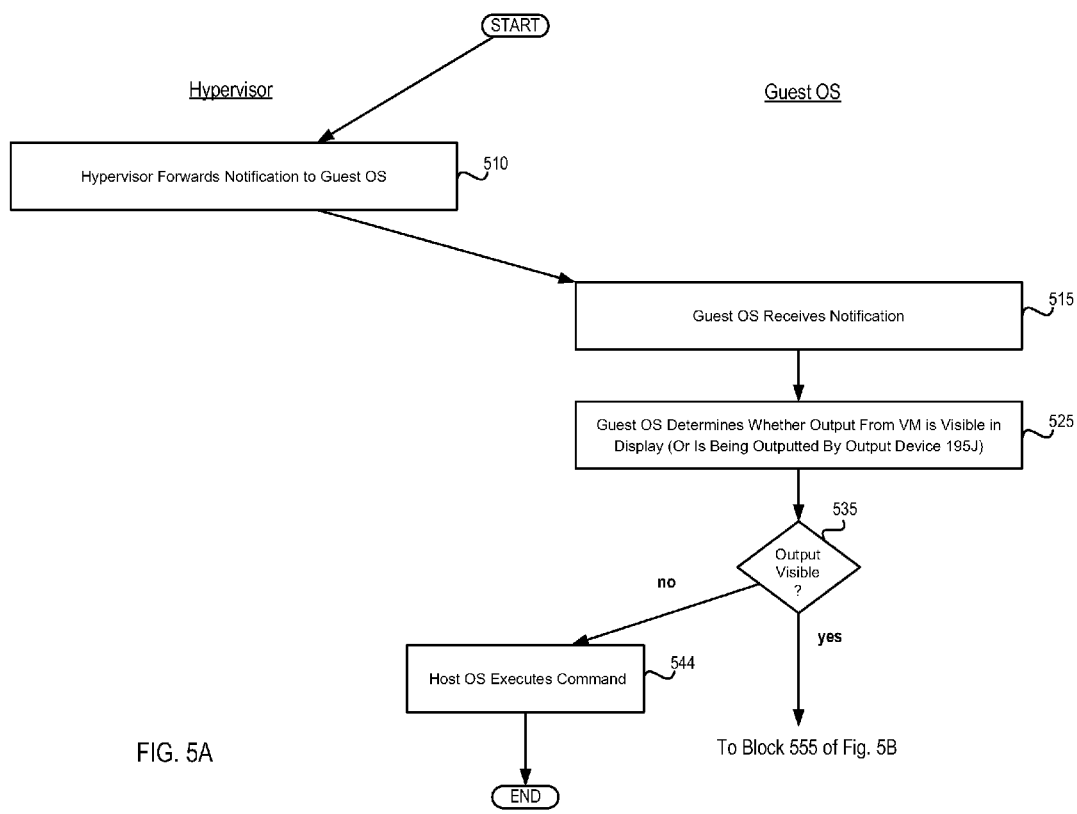
FIGS. 5A and 5B depict a flow diagram of one embodiment of another method for handling a notification that a host operating system has received a command to dim a display.
Figure 5B:
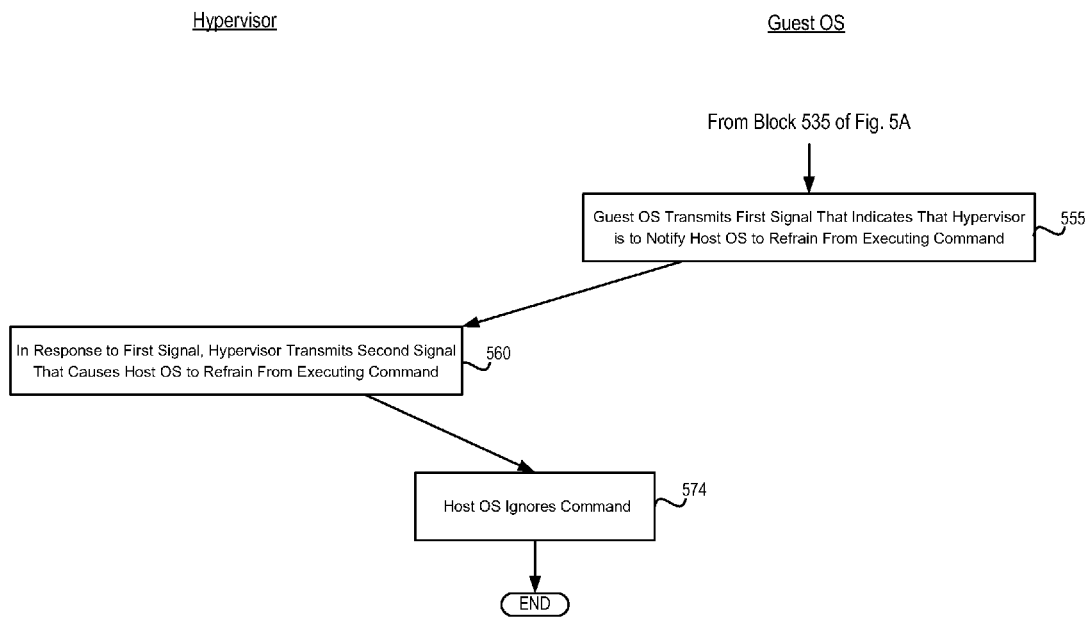

FIGS. 5A and 5B depict a flow diagram of one embodiment of another method for handling a notification that a host operating system has received a command to dim a display (or attenuate another output device). In this method, dimming of the display (or attenuation of another output device) is disabled only when output from virtual machine 130 is visible in the display (or is outputted by another output device); in some instances this handling of dimming and attenuation commands may be preferable to that of FIG. 4 above, where dimming of the display (or attenuation of another output device) is disabled only when output from virtual machine 130 is visible in the display (or is outputted by another output device). It should be noted that blocks depicted in FIGS. 5A and 5B can be performed simultaneously or in a different order than that depicted.

At block 510, hypervisor 125 forwards the notification to guest OS 220. In one embodiment, the notification is forwarded by output manager 128 and is received by virtual output manager 225.

At block 515, guest OS 220 receives the notification. At block 525, guest OS 220 determines whether output from virtual machine 130 is visible in display 180 (e.g., whether or not there is an application executing within VM 130 that has a visible window, versus the application being minimized), or alternatively whether output from VM 130 is being outputted by another output device 195J. In one embodiment, block 525 is performed by virtual output manager 225.

Block 535 branches based on the determination of block 525; if output is not visible, execution proceeds to block 544, otherwise execution continues at block 555 of FIG. 5B. At block 544, host OS 120 executes the command received at block 301 of FIG. 3, in normal fashion; after block 544, execution terminates.

At block 555, guest OS 220 transmits a first signal that indicates that hypervisor 125 should notify host OS 120 to refrain from executing the command received at block 301 of FIG. 3, in order to prevent dimming of display 180 (or attenuation of output device 195J) via the application within VM 130 that transmitted the notification at block 301. In one embodiment, virtual output manager 225 transmits this signal to output manager 128.

At block 560, hypervisor 125 transmits, in response to the first signal, a second signal that causes host OS 120 to refrain from executing the command, in order to prevent dimming of display 180 (or attenuation of output device 195J) via the application. In one embodiment, block 560 is performed by output manager 128. At block 574, host OS 120 ignores the command, thereby ensuring that dimming of display 180 (or attenuation of output device 195J) via the application is in fact disabled.

Figure 6:
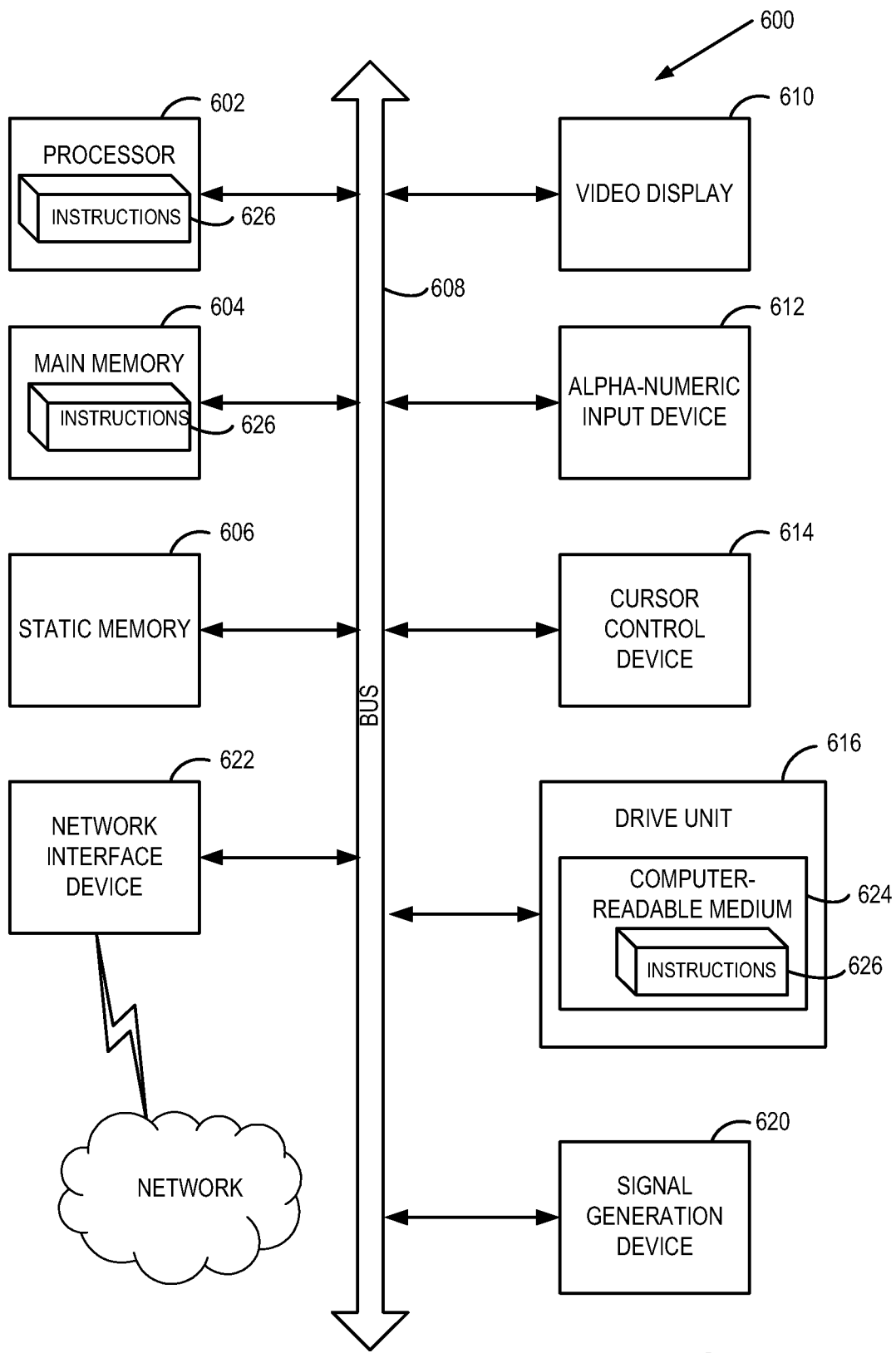
FIG. 6 depicts a block diagram of an illustrative computer system operating in accordance with embodiments of the invention.

FIG. 6 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions corresponding to the method of FIG. 3, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a hypervisor executed by a processor at a computer system, a notification from the computer system, wherein the notification indicates that a host operating system at the computer system has received a command to dim a display device at the computer system;
   forwarding, by the hypervisor, the notification to a guest operating system hosted by a virtual machine at the computer system;
   receiving, by the hypervisor, a first signal from the guest operating system, wherein the first signal indicates that the hypervisor is to notify the host operating system to refrain from executing the command, wherein the first signal is sent to the hypervisor by a virtual device in the guest operating system, and wherein the virtual device is mapped to the display device; and
   in response to receiving the first signal, sending, by the hypervisor, a second signal that notifies the host operating system to refrain from executing the command.

2. The method of claim 1 wherein the first signal is sent to the hypervisor in response to determining that output from the virtual machine is visible on the display device.

3. The method of claim 1 wherein the guest operating system is modified to receive the notification from the hypervisor.

4. The method of claim 1 wherein the guest operating system is modified to send the first signal to the hypervisor in response to receiving the notification from the hypervisor.

5. A method comprising:
   receiving, by a guest operating system hosted by a virtual machine executed by a processor at a computer system, a notification forwarded by a hypervisor at the computer system, wherein the notification indicates that a host operating system at the computer system has received a command to dim a display device at the computer system;
   determining, by the guest operating system, that output from the virtual machine is visible on the display device; and
   in response to determining that the output from the virtual machine is visible on the display device, sending, from the guest operating system, a first signal to the hypervisor, wherein the first signal indicates that the hypervisor is to notify the host operating system to refrain from executing the command.

6. The method of claim 5 wherein the first signal is sent to the hypervisor by a virtual device in the guest operating system, wherein the virtual device is mapped to the display device.

7. The method of claim 5 wherein the guest operating system is modified to receive the notification from the hypervisor.

8. The method of claim 5 wherein the guest operating system is modified to send the first signal to the hypervisor in response to receiving the notification from the hypervisor.

9. A computer system comprising:
   a bus to deliver signals to a display device; and
   a processor to communicate with the bus to:
      execute a hypervisor, receive, by the hypervisor, a notification from the computer system, wherein the notification indicates that a host operating system at the computer system has received a command to dim the display device at the computer system, forward, by the hypervisor, the notification to a guest operating system hosted by a virtual machine at the computer system, receive, by the hypervisor, a first signal from the guest operating system, wherein the first signal indicates that the hypervisor is to notify the host operating system to refrain from executing the command, wherein the first signal is sent to the hypervisor by a virtual device in the guest operating system, and wherein the virtual device is mapped to the display device, and in response to receiving the first signal, send, by the hypervisor, a second signal that notifies the host operating system to refrain from executing the command.

10. The computer system of claim 9 wherein the first signal is sent to the hypervisor in response to a determination that output from the virtual machine is visible on the display device.

11. The computer system of claim 10 wherein the processor is further to determine that the output from the virtual machine is visible on the display device.

12. The computer system of claim 9 wherein the guest operating system is modified to receive the notification from the hypervisor.

13. The computer system of claim 9 wherein the guest operating system is modified to send the first signal to the hypervisor in response to receipt of the notification from the hypervisor.

14. The computer system of claim 9 further comprising the display device.

15. A non-transitory computer readable storage medium having instructions stored therein, that when executed by a processor, cause the processor to perform operations comprising:

receiving, by a guest operating system hosted by a virtual machine executed by the processor at a computer system, a notification forwarded by a hypervisor at the computer system, wherein the notification indicates that a host operating system at the computer system has received a command to dim a display device at the computer system;

determining, by the guest operating system, that output from the virtual machine is visible on the display device; and in response to determining that the output from the virtual machine is visible on the display device, sending, from the guest operating system, a first signal to the hypervisor, wherein the first signal indicates that the hypervisor is to notify the host operating system to refrain from executing the command.

16. The non-transitory computer readable storage medium of claim 15 wherein the first signal is sent to the hypervisor by a virtual device in the guest operating system, wherein the virtual device is mapped to the display device.

17. The non-transitory computer readable storage medium of claim 15 wherein the guest operating system is modified to receive the notification from the hypervisor.

18. The non-transitory computer readable storage medium of claim 15 wherein the guest operating system is modified to send the first signal to the hypervisor in response to receiving the notification.

* * * * *